United States Patent [19]

Hamamoto

[11] Patent Number: 5,721,423
[45] Date of Patent: Feb. 24, 1998

[54] IMAGE READING SYSTEM HAVING RELATIVE DISPLACEMENT CONTROL MEANS

[75] Inventor: Akihiko Hamamoto, Kawasaki, Japan

[73] Assignee: Canon Kabushiki Kaisha, Tokyo, Japan

[21] Appl. No.: 652,345

[22] Filed: May 23, 1996

[30] Foreign Application Priority Data

May 23, 1995 [JP] Japan .................................. 7-123907

[51] Int. Cl.$^6$ ...................................... H01J 40/14
[52] U.S. Cl. ............................ 250/208.1; 250/559.38; 358/486
[58] Field of Search .......................... 250/208.1, 559.44, 250/559.38, 556; 358/482, 486, 488; 382/312

[56] References Cited

U.S. PATENT DOCUMENTS 4,661,703  4/1987  Ishikawa et al. ................. 250/317.1

Primary Examiner—Que Le
Attorney, Agent, or Firm—Fitzpatrick, Cella, Harper & Scinto

[57] ABSTRACT

There is disclosed an image reading apparatus having a sensor in which a plurality of photo-reception elements are arranged, a displacement mechanism for changing a relative position between the sensor and an original in an arranging direction of the photo-reception elements or a direction different from the arranging direction, a detecting unit for detecting an image interval on the original which was read by the sensor, and a control unit for controlling a relative displacement direction or displacement amount between the sensor and the original due to the displacement mechanism in accordance with the image interval detected by the detecting unit.

48 Claims, 14 Drawing Sheets

FIG. 8A
FIG. 8
| FIG. 8A |
| FIG. 8B |
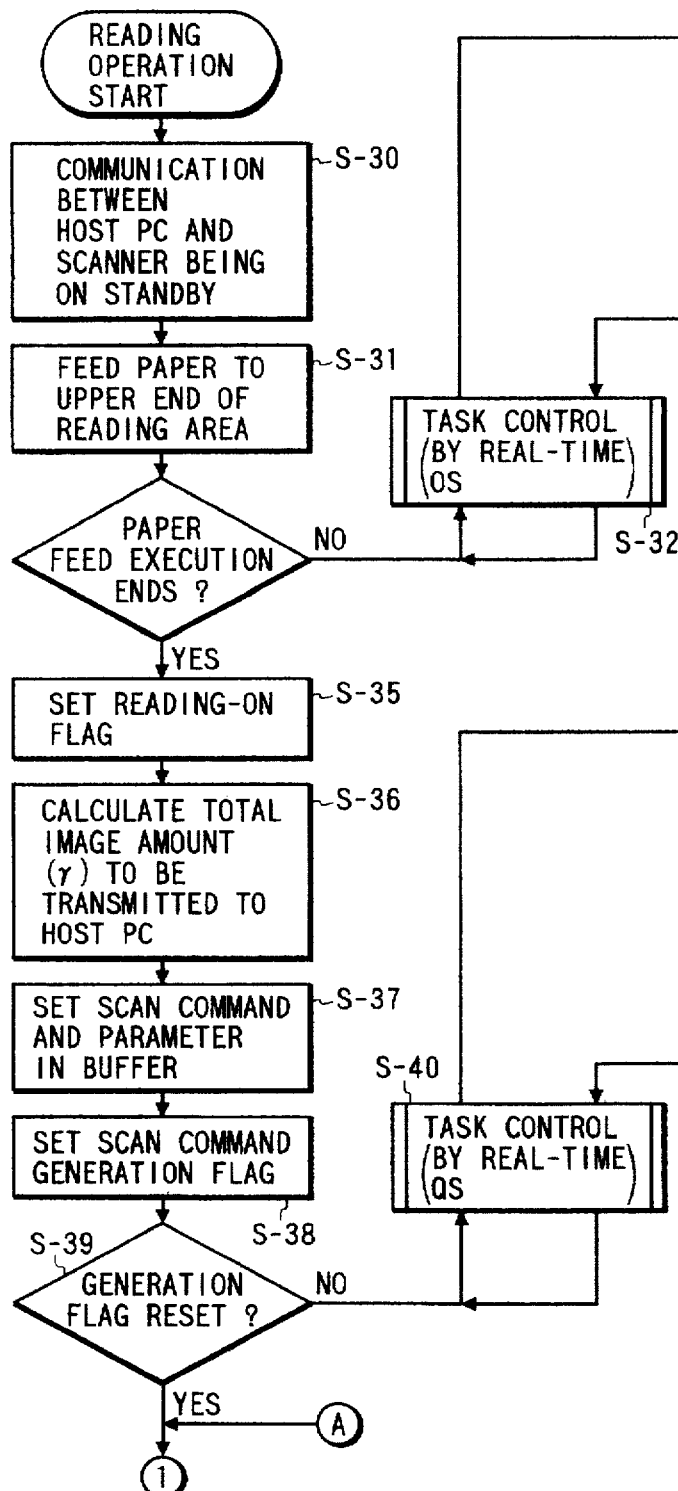
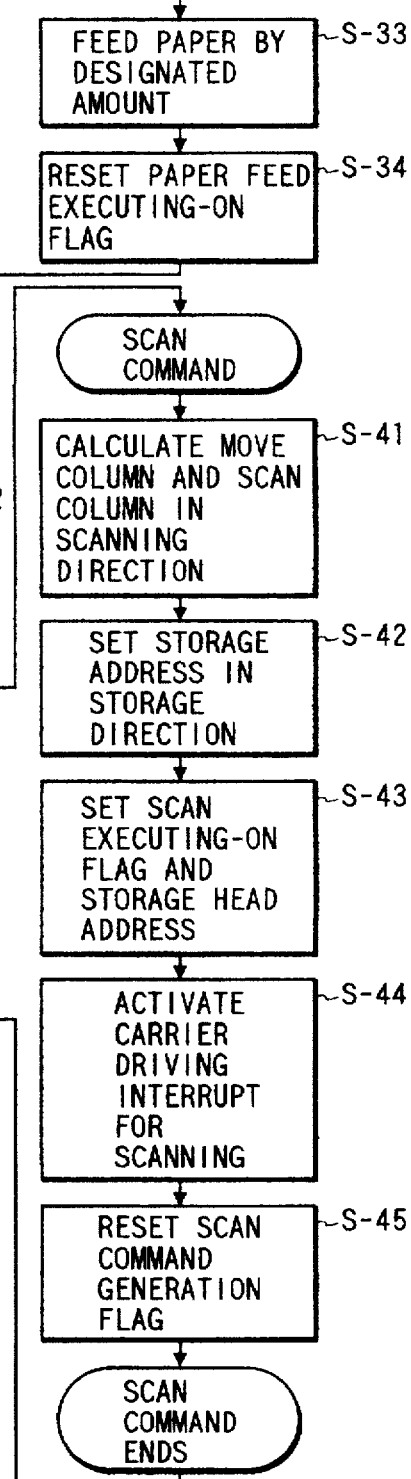

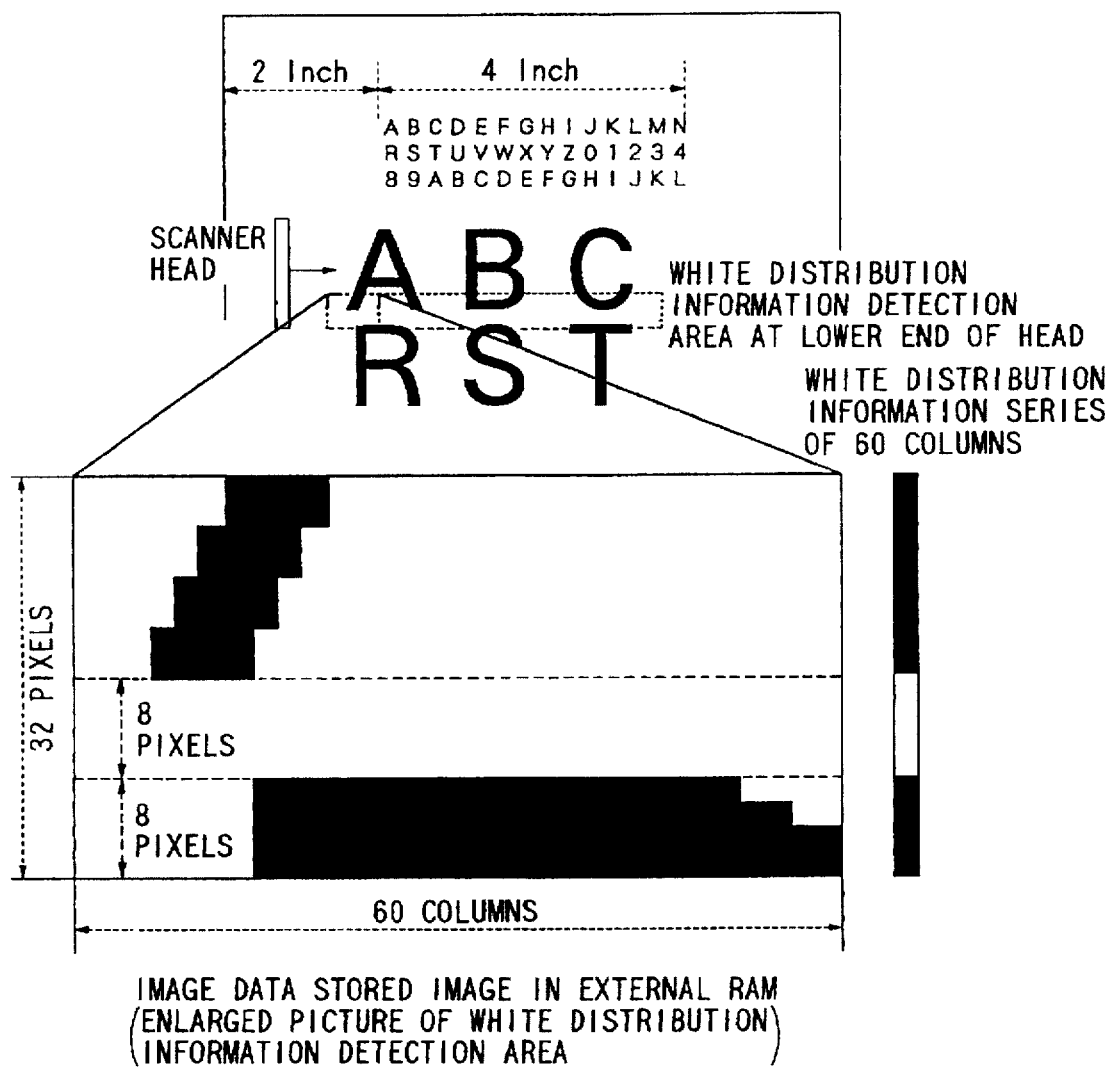

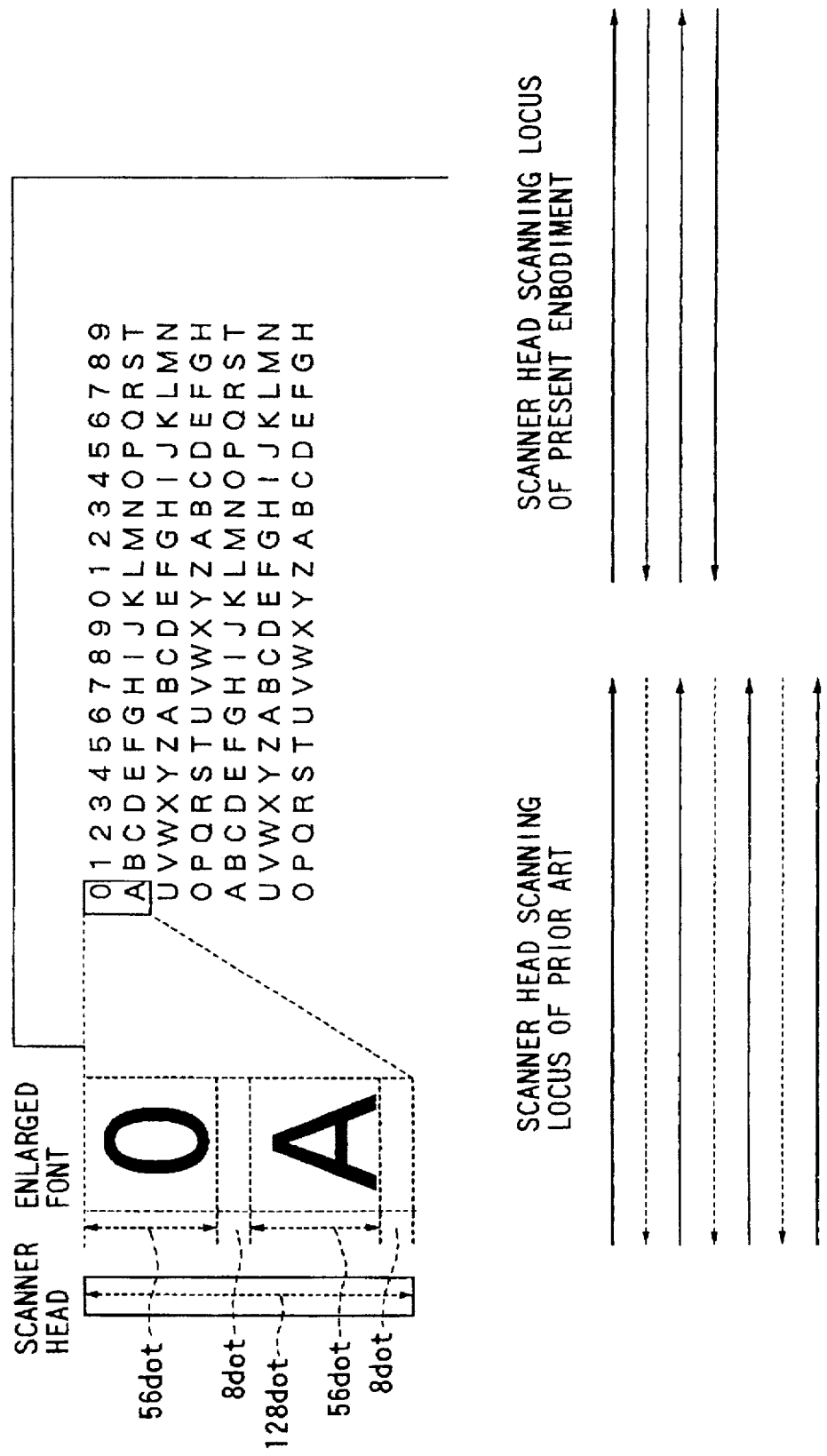

IMAGE READING SYSTEM HAVING RELATIVE DISPLACEMENT CONTROL MEANS

BACKGROUND OF THE INVENTION

1. Field of the Invention

The invention relates to an image reading system for reading an image on an original.

2. Related Background Art

In a conventional image reading apparatus, a flat bed type such that an original is read while a scanner unit of a line head type in which a group of photoelectric sensors are arranged in correspondence to a width of paper is moved in the direction perpendicular to the arranging direction of the sensor group is a main stream. According to such a type of image reading apparatus, although the image can be read at a high precision and at a high speed, since the photoelectric sensors as many as only the width of paper are needed, there is a limitation in terms of the size and costs of the apparatus. The flat bed type is, consequently, unsuitable for a personal use.

On the other hand, a personal word processor such that a scanner unit of what is called a serial type which can not only print but also read an image by arranging the photo-electric sensors in the direction that is parallel with the paper feeding direction is mounted in a carrier unit with a printing head has been realized as an article in recent years.

In such a serial type image reading apparatus, however, an image is read by repeating an image reading (scan) and a paper feeding while moving a carrier in the direction perpendicular to the paper feeding direction. Therefore, there is a problem such that when the image is read by what is called a bidirectional scan such that the Nth line is scanned from the left to the right and the (N+1)th line is scanned from the right to the left, a joint portion between one scan and one scan is deviated due to a precision or the like of a carrier scanning system, so that the image cannot be accurately read.

Although the scan in only one direction is effective in order to eliminate such a positional deviation and to read the image at a high precision, a reading time is longer than that in case of the bidirectional scan.

SUMMARY OF THE INVENTION

It is an object of the invention to provide an image reading system which can read an image at a high picture quality and at a high speed.

Another object of the invention is to provide an image reading apparatus which can read an image at a high picture quality and at a high speed.

Still another object of the invention is to provide an image reading method which can read an image at a high picture quality and at a high speed.

To accomplish the above object, according to an embodiment of the invention, there is provided an image reading apparatus comprising: a sensor in which a plurality of photo-reception elements are arranged; displacement means for changing a relative position between the sensor and an original in the arranging direction of the photo-reception elements or the direction different from the arranging direction; detecting means for detecting an image interval on the original which was read by the sensor; and control means for controlling a relative displacement direction or displacement amount between the sensor and the original due to the displacement means in accordance with the image interval detected by the detecting means.

According to another embodiment of the invention, there is provided an image reading apparatus comprising: a sensor in which a plurality of photo-reception elements are arranged; displacement means for changing a relative position between the sensor and an original in the arranging direction of the photo-reception elements or the direction different from the arranging direction; position detecting means for detecting the position of the sensor for the original; and control means for controlling a relative displacement direction between the sensor and the original due to the displacement means in accordance with the position of the sensor detected by the detecting means.

With the above construction, an image reading apparatus which can properly control the relative displacement direction or displacement amount between the sensor and the original and can read the image at a high picture quality and at a high speed can be provided.

According to further another embodiment of the invention, there is provided an image reading system for reading an image by using an image reading unit having a sensor in which a plurality of photo-reception elements are arranged, comprising: displacement means for changing a relative position between the sensor and the original in the arranging direction of the photo-reception elements or the direction different from the arranging direction; detecting means for detecting an image interval on an original read by the sensor; and control means for controlling a relative displacement direction or displacement amount between the sensor and the original due to the displacement means in accordance with the image interval detected by the detecting means.

According to further another embodiment of the invention, there is provided an image reading system for reading an image by using an image reading unit having a sensor in which a plurality of photo-reception elements are arranged, comprising: displacement means for changing a relative position between the sensor and an original in the arranging direction of the photo-reception elements or the direction different from the arranging direction; position detecting means for detecting the position of the sensor for the original; and control means for controlling a relative displacement direction between the sensor and the original due to the displacement means in accordance with the position of the sensor detected by the detecting means.

With the above construction, an image reading system which can properly control the relative displacement direction or displacement amount between the sensor and the original and can read the image at a high picture quality and at a high speed can be provided.

According to further another embodiment of the invention, an image on an original is read by changing a relative position between a sensor and the original in the arranging direction of a plurality of photo-reception elements arranged in the sensor or the direction different from the arranging direction, the image interval on the original read by the sensor is detected, and the relative displacement direction or displacement amount between the sensor and the original is controlled in accordance with the image interval detected.

According to further another embodiment of the invention, an image on an original is read by changing the relative position between a sensor and the original in the arranging direction of a plurality of photo-reception elements arranged in the sensor or the direction different from the arranging direction, the position of the sensor for the original is detected, and the relative displacement direction between the sensor and the original is controlled in accordance with the position of the sensor detected.

With the above construction, an image reading method which can properly control the relative displacement direction or displacement amount between the sensor and the original and can read the image at a high picture quality and at a high speed can be provided.

The above and other objects and features of the present invention will become apparent from the following detailed description and the appended claims with reference to the accompanying drawings.

BRIEF DESCRIPTION OF THE DRAWINGS

FIG. 9 is an image diagram of a detection of white distribution information on an original image in the embodiment;

FIG. 13 is a scanning image diagram of a carrier for explaining an effect of the embodiment.

DETAILED DESCRIPTION OF THE PREFERRED EMBODIMENTS

Figure 1:
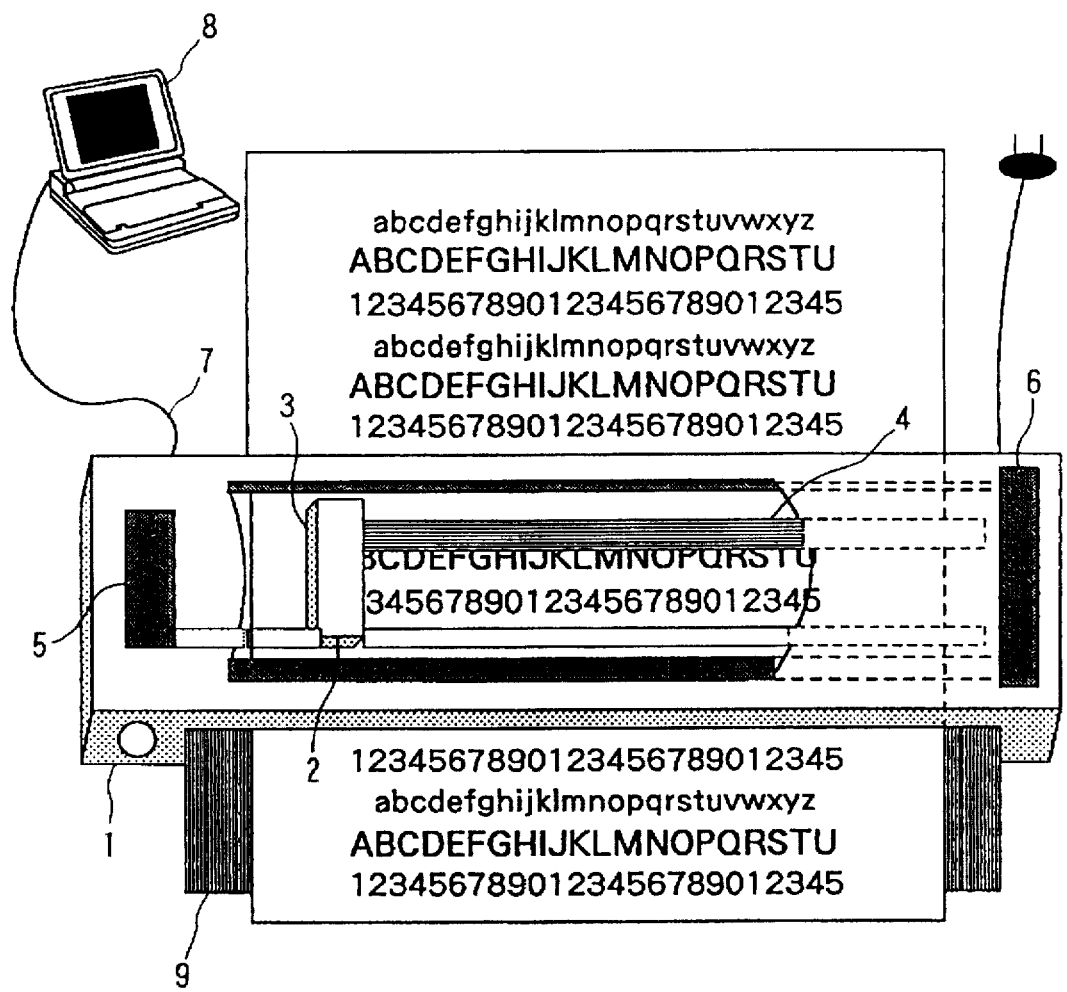
FIG. 1 is an external view of an image reading apparatus connected to a personal computer in an embodiment.

FIG. 1 is a constructional diagram of an image reading system according to an embodiment of the invention.

In the system, a scanner unit 2 is attached to a reading apparatus main body 1 by being held by a carrier unit 3. Digital image data which was A/D converted by the scanner unit 2 is transferred to a main control unit, which will be explained hereinlater, through a flexible cable 4. The main control unit controls a mechanical driving system such as paper feeding unit 6, the carrier unit 3, and the like and edits or processes the image data read by the scanner unit 2 as necessary, and transfers the resultant data to a host PC 8.

The scanner unit 2 scans in the direction perpendicular to the paper feeding direction by a carrier driving unit 5. An original paper on a paper supplying tray 9 is sent in the direction perpendicular to the scanning direction of the carrier unit 3 by the paper feeding unit 6. Further, an input/output connector 7 is used to input and output a command or image data between the host PC 8 and the image reading apparatus 1.

Further, a PE sensor which is located between the carrier driving unit 5 and the paper supplying tray 9 and is used to detect the presence or absence of the original paper and an HP sensor for detecting the absolute position of the carrier unit 3 are provided. (Those sensors are not shown.)

Figure 2:
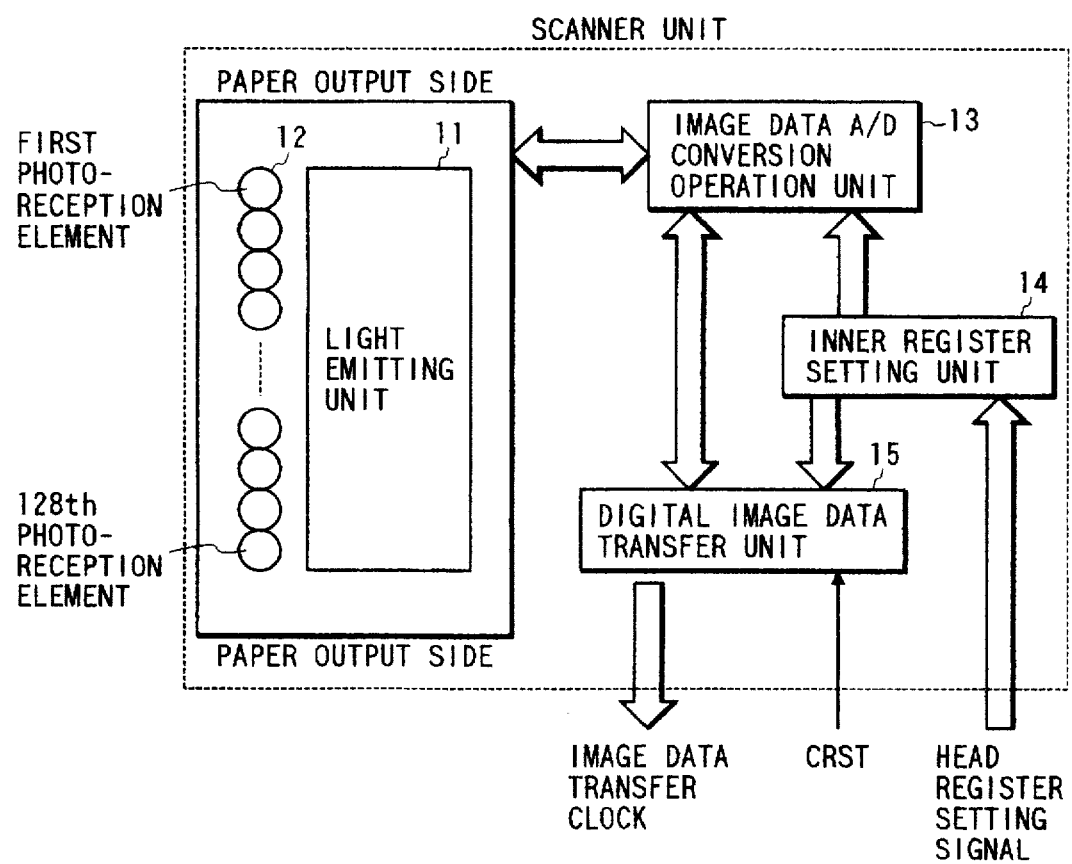
FIG. 2 is a functional block diagram of a scanner unit of the embodiment.

FIG. 2 is a constructional diagram of the scanner unit 2 shown in FIG. 1. The scanner unit 2 is constructed by: a light emitting unit 11 for irradiating a reading surface of the original; a photo-reception unit 12 comprising 128 photo-reception elements arranged at a density of 360 d.p.i. in the paper feeding direction in order to receive a reflected light from the original reading surface; an operation unit 13 for converting an analog signal which is outputted from the photo-reception unit 12 into a digital signal; an internal register setting unit 14 for designating various modes at the time of the digitization from a main control unit; and an image data transfer unit 15 for transferring the image data converted to the digital signal corresponding to a set value of the register setting unit 14 to the main control unit.

Figure 3:
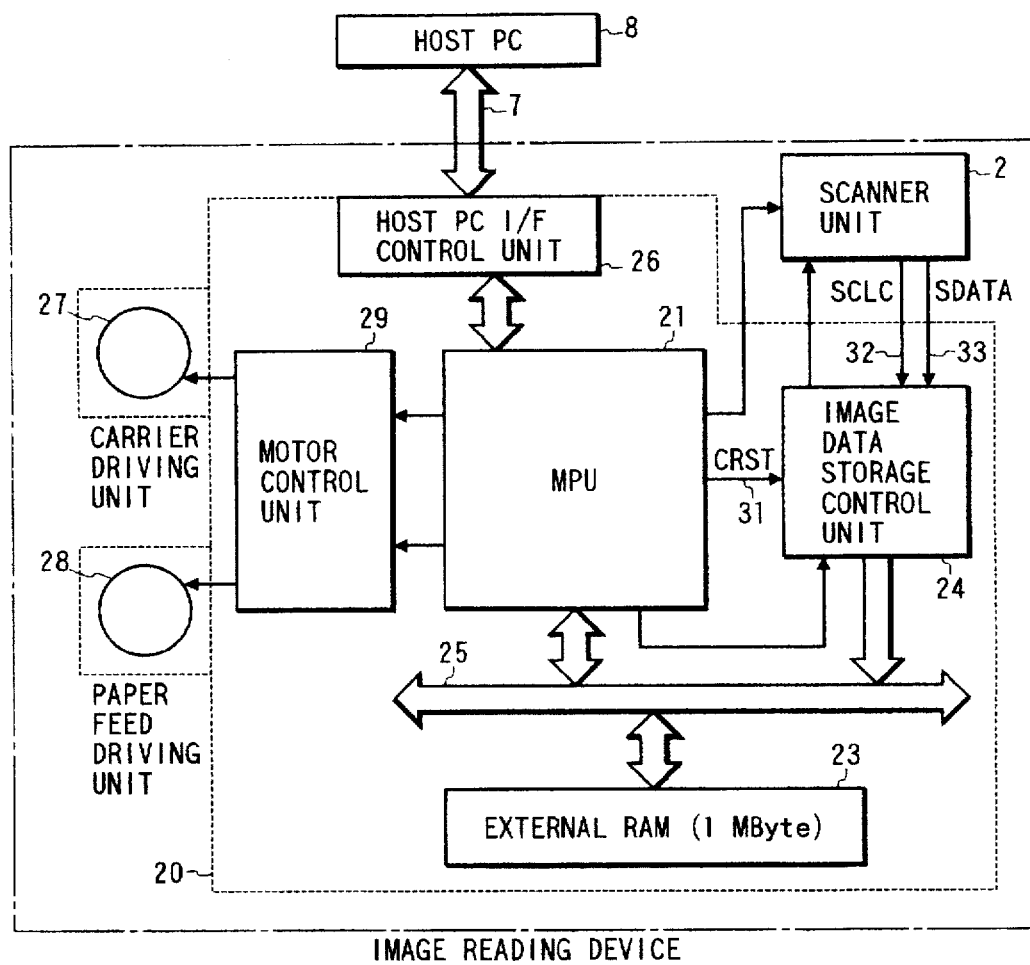
FIG. 3 is an electric block diagram of an image reading apparatus of the embodiment.

FIG. 3 is an electric block diagram around a main control unit 20 as a center. The main control unit 20 is mainly constructed by an MPU 21. The MPU 21 is what is called a one-chip microcomputer having therein an ROM in which an operating procedure for the MPU 21, various tables for controlling motors, and the like have been stored and an internal work RAM which is used for an arithmetic operation or the like of the MPU 21.

Around the MPU 21, there are arranged: an external RAM 23 of 1 Mbytes for storing the image data transferred from the scanner unit 2; an image data storage control unit 24 for converting the serial image data from the scanner unit 2 to the parallel data and sequentially storing the parallel image data from a designated address in an external RAM area that is designated by the MPU 21; a data bus 25 which is constructed by an address line and a data line and enables accesses to an RAM area from both of the MPU 21 and image data storage control unit 24; a host PC interface control unit 26 for receiving a command from the host PC 8 via the I/O connector 7 or for transferring the read image data to the host PC 8; a motor control unit 29 for controlling current amounts of a stepping motor 27 for driving the carrier unit (hereinafter, simply referred to as a carrier driving unit 27) and a stepping motor 28 for a paper feeding (hereinafter, simply referred to as a paper feed driving unit 28) in accordance with control signals from the MPU 21; and the like.

Both of the carrier driving unit 27 and paper feed driving unit 28 are designed at gear ratios such that the carrier and the original paper are moved by 1/360 inch by one pulse of the motor (namely, one step).

The image data storage control unit 24 and scanner unit 2 are synchronized by a CRST (Column Read Start Timing) signal 31 which is generated from the MPU 21. Each time the carrier unit is moved by 1/360 inch, the MPU 21 generates a CRST signal as a one-shot signal. The scanner unit 2 uses the one-shot signal as a trigger and transfers the image data of one column to the image data storage control unit 24 as data of a serial format by an image clock signal 32 (SCLK) and an image data signal 33 (SDATA). In the storage control unit 24, the serial image data which was transferred is converted to the parallel data by setting eight bits to one unit and, after completion of the conversion, the image data is stored into the external RAM 23 via the data bus 25 from the head address shown by the storage address.

Figure 4:
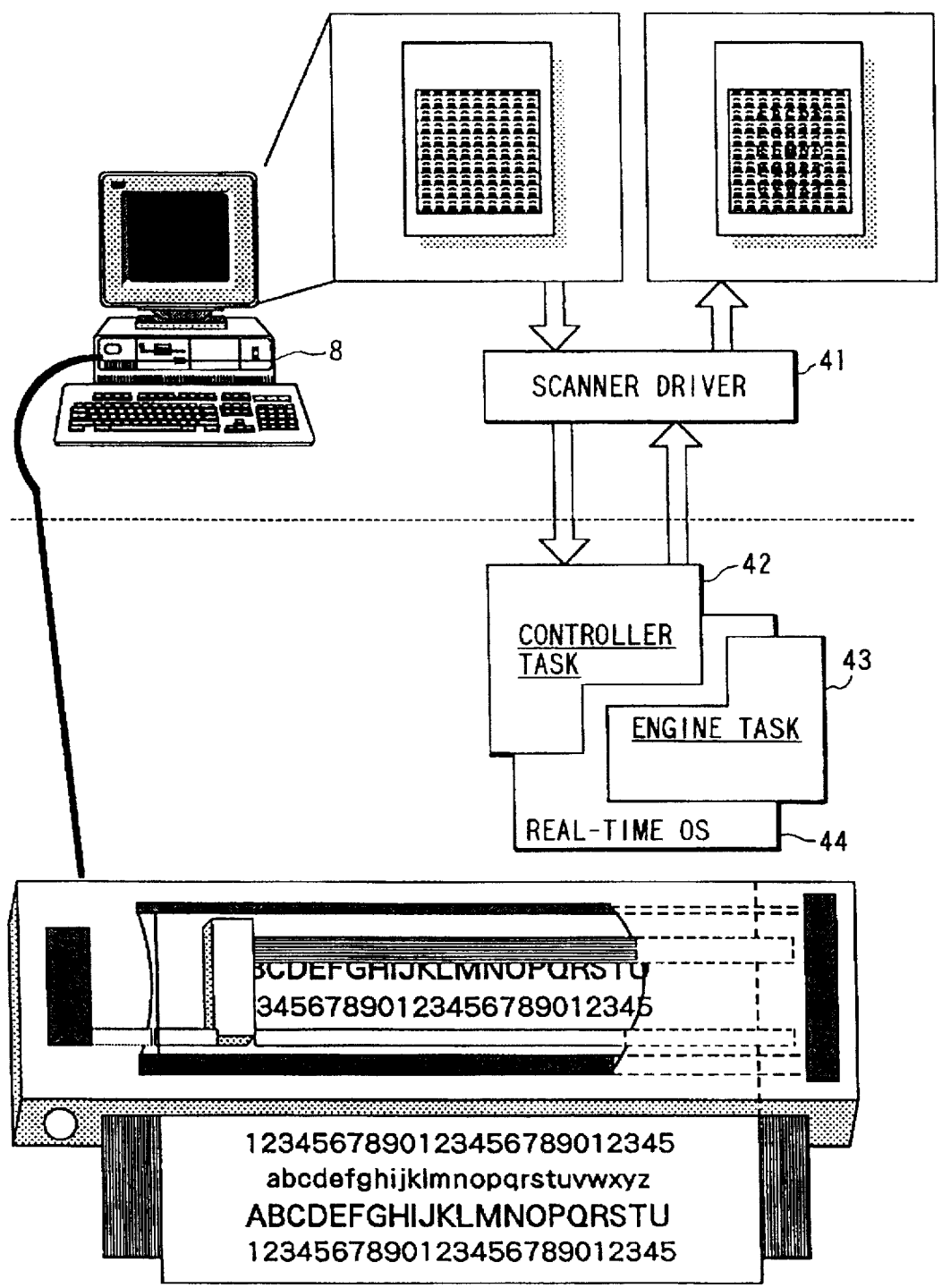
FIG. 4 is a software hierarchy diagram in an image reading system of the embodiment.

FIG. 4 is a software hierarchy diagram in the embodiment including the component elements up to the host PC 8. The user designates various parameters and a reading area through a scanner driver 41. The scanner driver 41 sends commands to designate a reading mode and a reading area in accordance with the set value to the scanner apparatus 1.

A control software in the scanner apparatus 1 is constructed by three blocks of: a controller task 42 for mainly controlling a command, a status, and image data with the host PC 8; an engine task 43 for controlling the scanner unit in the scanning apparatus and a motor system of the carrier and paper feed in accordance with commands from the controller; and a real-time OS 44 for managing status transitions of both of the tasks.

The real-time OS 44 conforms with the μITRON specifications and its description is omitted because it is not particularly related to the invention.

Figure 5:
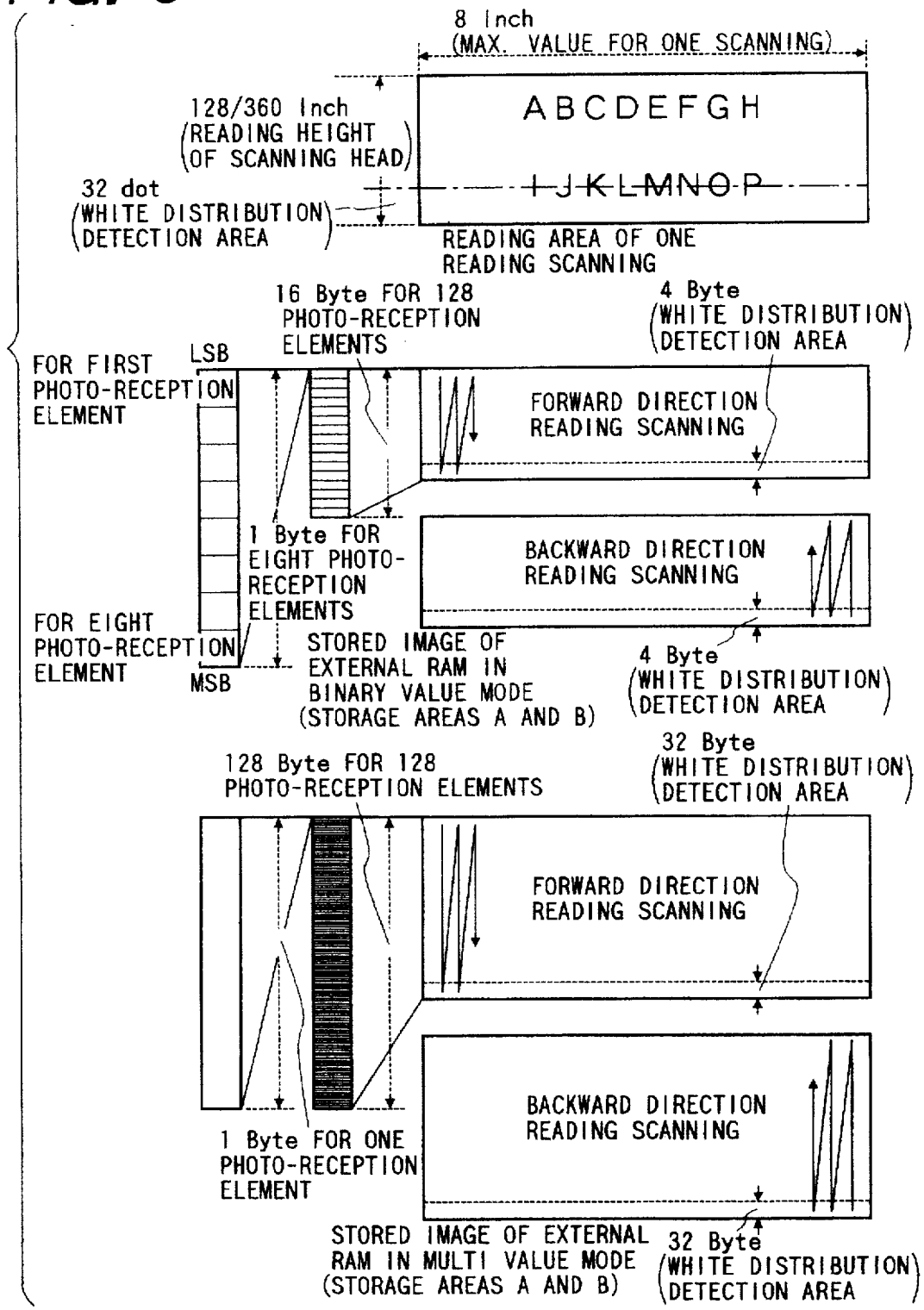
FIG. 5 is a storage image diagram of image data in an external RAM of the embodiment.

FIG. 5 shows a mapping of the external RAM 23 and a storage format of the image data. Voltage values which were photo-received by the 128 photo-reception elements and were generated are sequentially stored into a predetermined area in the RAM 23 by 16 bytes per one column while setting the photo-reception voltage value of one photo-reception element to a digital value of one bit in case of a binary value mode. In case of a multi-value mode, those voltage values are sequentially stored into a predetermined area in the RAM 23 by 128 bytes per one column while setting the photo-reception voltage value of one photo-reception element to a digital value of eight bits.

As for a data storage direction into the storage area, there are a forward direction storage such that storage area addresses are sequentially increased from a small value in case of scanning the reading original from the left to the right (forward direction) and a backward direction storage such that the storage area addresses are sequentially decreased in case of scanning from the right to the left (backward direction). A register to designate a storage head address and a register to designate a storage direction are built in the image data storage control unit 24 and are designated from the engine task via the address/data buses.

Figure 6:
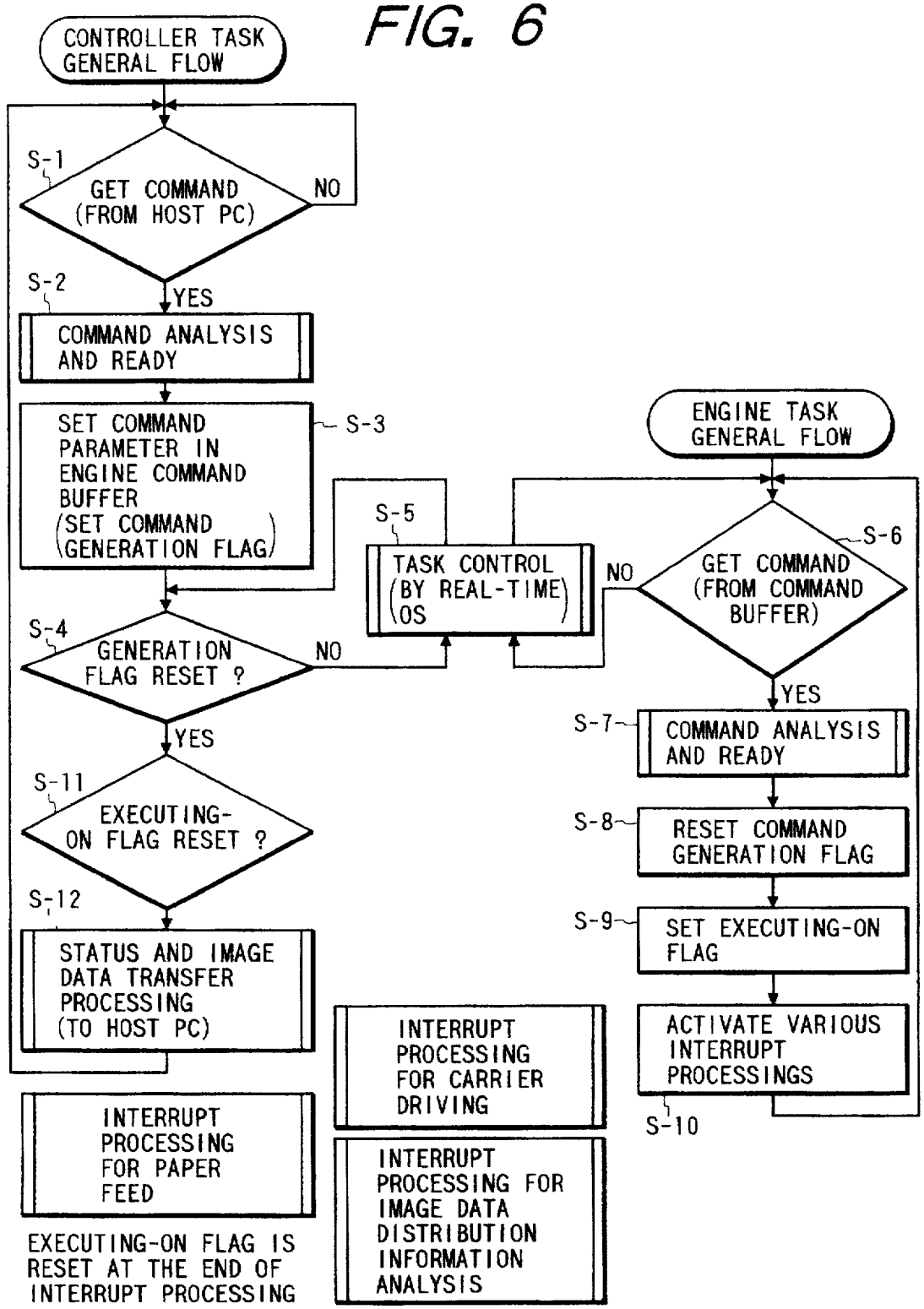
FIG. 6 is a general control flowchart of a controller task and an engine task in the embodiment.

A general operating flow of the controller task and engine task is shown in FIG. 6.

First, the controller task gets commands such as paper supply, reading, paper output, and the like which are generated from the host PC 8 and are supported by the reading apparatus of the embodiment through the host PC I/F control unit 26 (S-1). Subsequently, roles of the commands from the host PC 8 are distributed to the controller task and the engine task (S-2). The commands which are instructed to the engine task and parameters are set into an engine command buffer and, at the same time, a command generation flag is set (S-3).

As for an interface between the controller task and the engine task, there are: a group of various commands such as paper supply, scan, paper feeding, paper output, and the like which are sent from the controller task to the engine task; and a group of statuses for notifying the controller task of an operating status of the engine task and an operation result of the command. Both of the command group and the status group have been defined in a common work in the internal RAM and can be set, reset, and referred to from both tasks.

The controller task monitors at a period of 10 msec that each command generation flag is reset by the engine task (S-4). An occupation right of the MPU is shifted from the controller task to the engine task by a task managing function of the real-time OS (S-5).

According to the engine task, the command which was set from the foregoing command buffer by the controller task is got (S-6), a preparation for the processing corresponding to the command is performed (S-7), after that, the command generation flag which has been set by the controller task is reset (S-8), in place of it, an executing-on flag indicating that the command is being executed is set (S-9), a setting for activating various interrupt processings corresponding to each command is performed (S-10), and the next command is got.

When there is no unprocessed command, the occupation right of the MPU is again shifted from the engine task to the controller task by the real-time OS. In the embodiment, the paper feeding operation, driving operation of the carrier unit, further, an analysis processing of image data distribution information, and the like are executed during an interrupt processing, which will be explained hereinlater, and the executing-on flag which has been set in step S-10 of the final part is reset.

After a fact that the occupation right of the MPU 21 had again been shifted to the controller task and the generation flag had been reset was confirmed, the apparatus waits until the executing-on flag is reset (S-11). A status indicative of a situation in the apparatus which has been set in the common work in the internal RAM and the image data which has been stored in a predetermined area in the external RAM and was read out are transferred to the host PC 8 through the host PC I/F control unit 26 as necessary (S-12).

As for the various interrupt processings which are activated in step S-10 mentioned above, there are an interrupt processing for a carrier driving to scan the carrier unit 4 by rotating the carrier motor 27, an interrupt processing for a paper feeding to feed the paper by rotating the LF motor 28, and the like. In the embodiment, however, the image data distribution information among them will be described in a 60-column counter interrupt processing, which will be explained hereinlater.

Although the general flow which is common to each of the commands has been described above, an individual operating flow of each command will now be described hereinbelow.

Figure 7:
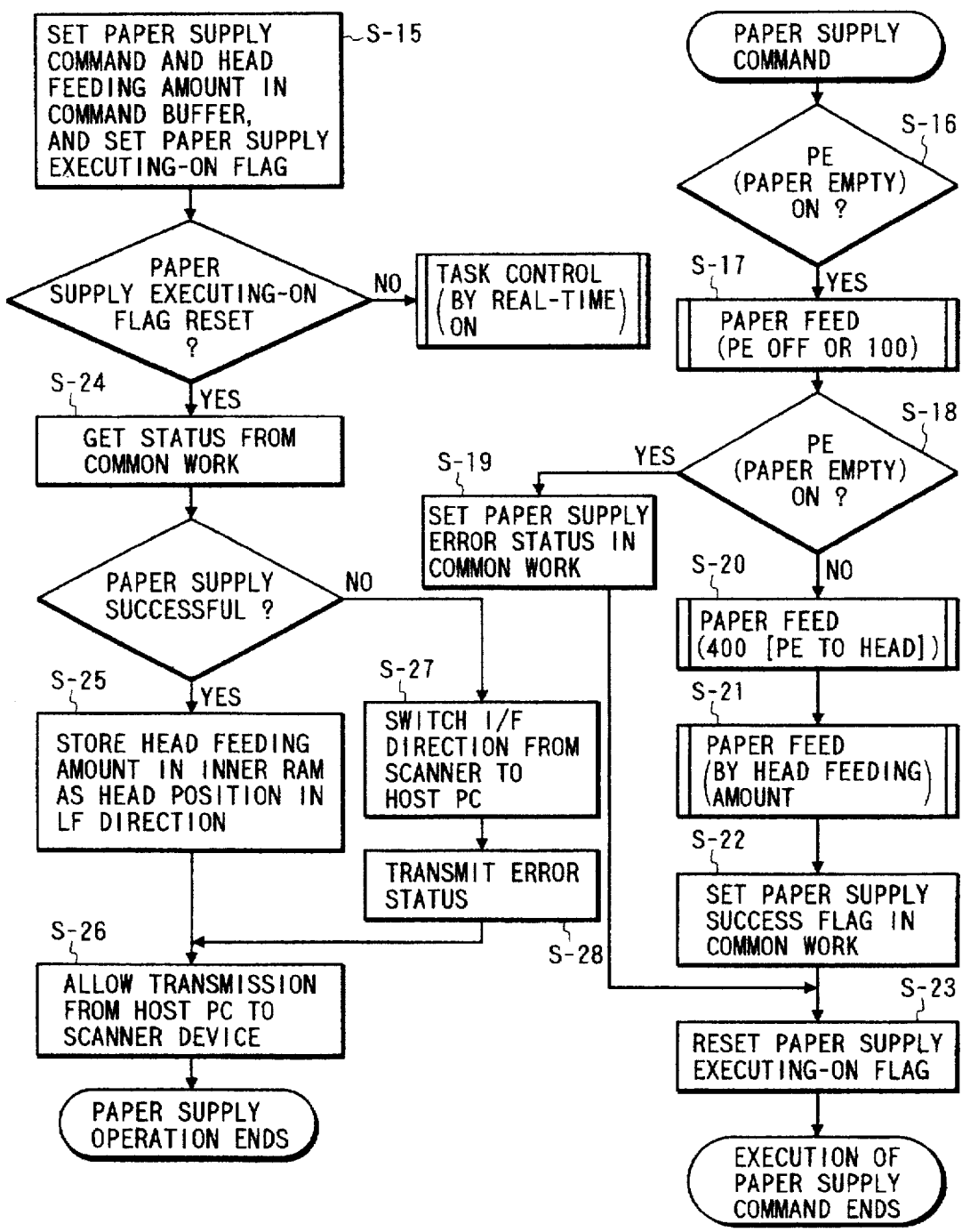
FIG. 7 is a control flowchart when a paper supply command is received from a host PC in the embodiment.

First, FIG. 7 shows a control flow for the paper supply operation. According to the controller task, when a paper supply command which was transmitted from the host PC 8 through the host PC I/F control unit 26 is received, the paper supply command and a parameter are set into a command buffer for the engine task (S-15). The parameter is set on a unit basis of 1/360 inch as a paper feed amount upon paper supply which is designated from the host PC.

In the engine task, the command set in the command buffer is discriminated as a paper supply command, so that a paper supply command processing is executed. A value of a PE (Paper Empty) sensor which is inputted to a port of the MPU 21 is judged (S-16). When it is ON (no paper), the paper feed is performed by the paper feed driving unit 28 until the PE sensor is turned off (there is a paper) from the on state (no paper) with an upper limit (for example, 1000 pulses) (S-17).

In the embodiment, the paper supplying tray is obliquely attached and has a structure such that when the original paper is put onto the tray, the paper front edge naturally collides with a paper supplying roller as a part of the paper feeding unit (not shown).

A length from the paper supplying roller to the PE sensor is set to one inch. Even when the paper feeding stepping motor is rotated by 1000 pulses in step S-17, if the PE sensor is not changed to the off state (there is a paper) (S-18), a paper supply error status is set into the common work and the processing routine is branched to a final part of the paper supplying routine (S-19).

After the change from ON to OFF of the PE sensor was detected, the paper feeding is executed by using the paper feeding unit from the PE sensor to the position of the first photo-reception element on the scanner unit (S-20). After that, the paper feeding is further executed by the paper feed amount designated from the controller task (S-21). A paper supply success status is set into the common work (S-22). A paper supply executing-on flag is reset (S-23). The paper supplying routine is finished.

The actual paper feeding operation is realized by executing each interrupt operating module for stopping, accelerating, moving at a constant speed, decelerating, and stopping the paper feeding stepping motor by the designated pulses in the paper feeding interrupt processing. The flags in steps S-22 and S-23 are set or reset in a stopping module.

When the occupation right is shifted to the controller task, the processing routine is shifted from the waiting routine and the status which was set by the engine into the common work is checked (S-24). When the paper supply operation is successful, the paper feed amount issued to the engine task is held in the work in the internal RAM as LF direction head position information (S-25). A command transfer to the scanner apparatus 1 is permitted through the host PC I/F control unit 26 and the apparatus enters a mode to get the next command from the host PC 8 (S-26).

When the paper supply operation fails, a control mode is once changed to a transfer mode for transferring the data from the scanner apparatus 1 to the host PC via the host PC I/F control unit (S-27). After that, the details of an error status are transferred to the host PC (S-28). The control mode is again switched to the transfer mode for transferring the data from the host PC to the scanner apparatus (S-26). The system enters a mode to get the next command.

The reading operation will now be described.

Figure 8B:
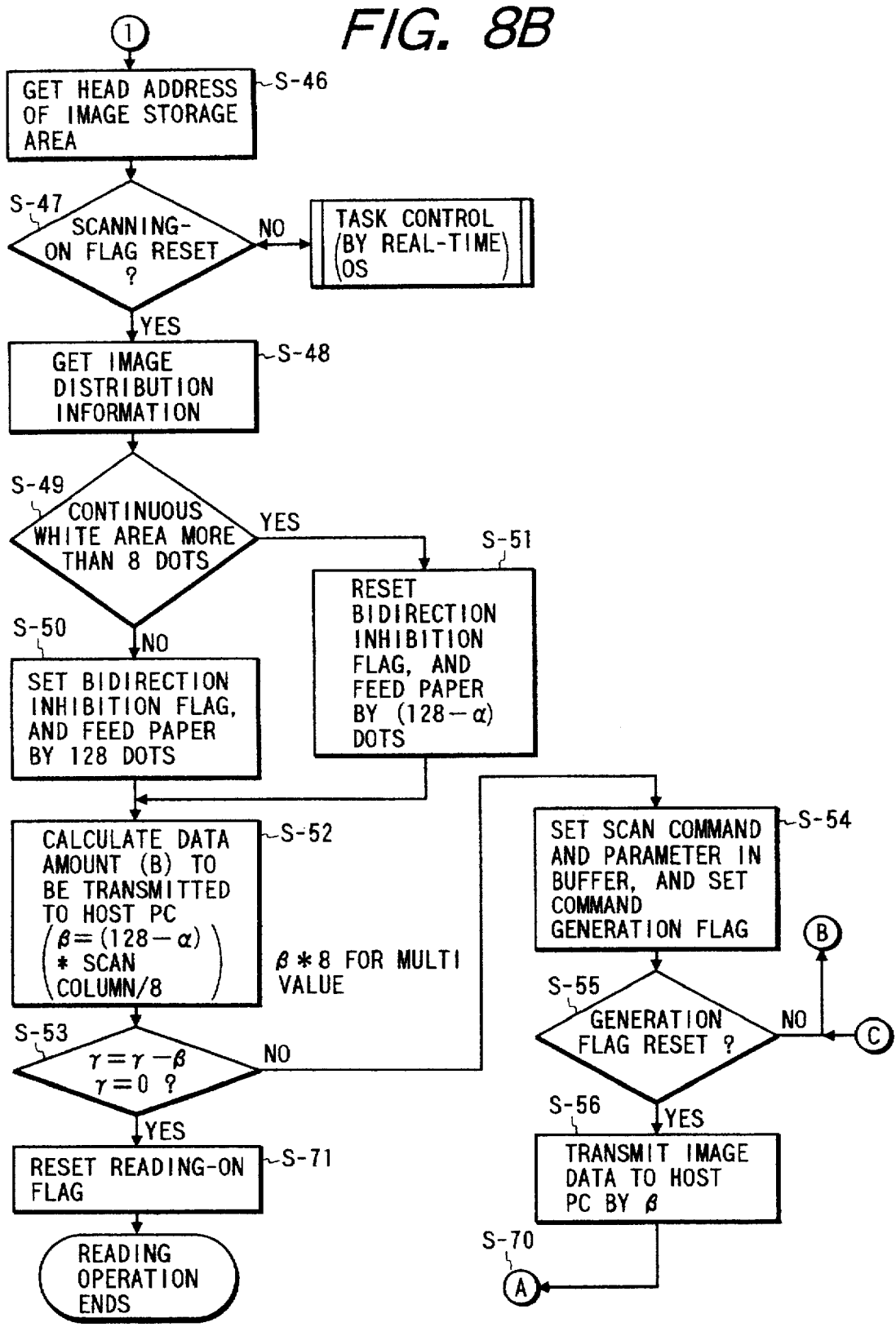
FIG. 8 which is composed of FIGS. 8A and 8B is a control flowchart when a reading command is received from the host PC in the embodiment.

FIGS. 8A and 8B show a control flow for the controller task and engine task in the case where a reading command was transmitted from the host PC 8. The reading command from the host PC 8 is annexed with parameters of a reading range and a reading mode. In the reading range, the left upper end of the original paper is set to an origin (x0, y0) (two-dimensional coordinates: x denotes a direction perpendicular to the arranging direction of the photo-reception elements and y indicates a direction perpendicular to x) and the coordinate values of the left upper end and the right lower end of the reading range are designated on a unit basis of 1/360 inch.

The parameter of the reading mode is used to select either a binary value mode in which an analog voltage value that is received by one photo-reception element is read as a binary value of 0 or 1 or a multi value mode in which it is read as a multi value of eight bits of 0 to 255.

The controller task which received the reading command sets a communication between the host PC 8 and the scanner apparatus 1 into a standby mode through the host PC I/F control unit 26 (S-30) and generates a paper feeding command to the engine task so as to feed the paper by only a distance corresponding to a value obtained by subtracting an LF direction head position information value stored in step S-25 from the y coordinate value of the left upper end of the reading range that is designated by the parameter of the reading command (S-31).

A resource occupation right of the MPU 21 is shifted to the engine task by the real-time OS (S-32). The paper feed of a designated paper feed amount is executed (S-33) by rotating the paper feed driving unit 28 by the designated amount. A paper feed executing-on flag is reset (S-34). The paper feeding routine is finished.

The paper feeding routine by the engine task is finished and the occupation right is again shifted to the controller task by the real-time OS (S-32). The controller task sets a reading-on flag that is referred to by the paper feeding command during the reading operation by the engine task, which will be explained hereinlater (S-35). On the basis of the reading range and the reading mode, a total amount ($\gamma$) of image data which is transferred from the scanner apparatus 1 to the host PC 8 is calculated by the following equation (S-35). Binary value:

(right lower end x value—left upper end x value)*

(right lower end y value—left upper end y value)/8      [Bytes]

Multi value:

(right lower end x value—left upper end x value)*

(right lower end y value—left upper end y value)      [Bytes]

For example, in an original shown in FIG. 9, the total image data amount in case of reading the area of a 4-inch square in the binary value mode is equal to 259,200 Bytes (=360*4*60*⅛).

According to the controller task, a scan command and the number of columns to the reading left end position and the number of columns to the reading right end position when the left end of the paper is set to an original are used as parameters and the scan command is set into an engine command buffer (S-37), a scan command generation flag is set (S-38), and the system waits until the flag is reset by the engine task at a period of 10 msec (S-39).

The occupation right of the MPU 21 is shifted to the engine task by the real-time OS (S-40). A scanning routine by the engine task is started. A reading direction (carrier scanning direction), a movement amount (Move columns) to the reading start position, and a movement amount (Scan columns) during the reading operation are calculated (S-41) on the basis of the two parameters (reading left end position and reading right end position) in the command buffer and carrier stop position information which is managed by the engine task.

The carrier stop position information is updated each time the carrier is moved at a head stop position in the direction perpendicular to the paper feeding direction and is held into the work. "Home Position" is located at a position that is further shifted from the left end of the original paper to the left by a distance corresponding to the acceleration (the number of steps which are necessary to shift from the stop state to the constant speed state) of the carrier unit. In the initial operation after the turn-on of the power source, the MPU grasps the physical position of the carrier unit by using an output value from an HP (Home Position) sensor arranged on the scanning line of the carrier unit, thereby moving the carrier unit to the position of the origin.

When the carrier scanning direction is selected, by comparing the magnitudes of |carrier stop position—left end position| and |carrier stop position—right end position|, the position is decided from the smaller value to the larger value, namely, the position that is nearer to the carrier stop position is determined as a reading start position.

For example, in the case where the engine task receives the first scan command to read the original in FIG. 9, since the coordinates of the carrier stop position are equal to 0 because it is not moved. On the other hand, since the left end position of the image information on the original is located from 2 inches from the left end of the paper, its coordinates are set to 720 (=360*2). Since a width of whole image information is equal to 4 inches, the coordinates of the image information right end position are set to 2160 {=360*(2+4)}. Therefore, since the carrier stop position is located at the left end, by moving the carrier from the left to the right (forward direction), the reading operation is performed. The Move columns are equal to 720 and the Scan columns are equal to 1440 (2160−720).

In the embodiment, as shown in FIG. 4, two image data storage areas for storing the image data are provided in the external RAM and are alternately switched each time the scan command is executed. The engine task sets a storage head address and a storage direction for the image data storage control unit (S-42).

The storage of the image data of one column is started by using the CRST signal, as a trigger, which is generated from the MPU 21 each time the carrier unit is moved by one column in order to synchronize the scanner head with the image data storage control unit 24. The first CRST signal in one scan command is generated at a time point when the carrier unit reaches the reading start position in the carrier interrupt processing.

The engine task sets a scanning-on flag indicating that the scanning operation is being executed at present into the controller task and also sets a head address in the image data storage area into a work for return in the internal RAM (S-43). In case of reading in the forward direction, the address value set in step S-42 is used as a value of-a work for return. In case of reading in the backward direction, the address obtained by subtracting the number of image data from the address set in step S-42 is used as a value of the work for return.

The engine task executes an activating routine for driving the carrier unit by the three input parameters of the reading direction, the number of Move columns, and the number of Scan columns (S-44). In this instance, by merely setting the three parameters and starting a timer for the carrier motor and permitting a timer interrupt processing, the actual carrier driving is executed by a timer interrupt processing (carrier interrupt processing) for the carrier motor of the MPU.

The engine task resets a scan command generation flag which was set by the controller task (S-45), finishes the scan command routine, and moves the occupation right of the MPU 21 to the controller task (S-40).

When it is detected that the scan command generation flag was reset, the controller task gets an image data storage address as a return value of the scan command (S-46) and detects at a period of 10 msec that the scanning-on flag is reset (S-47).

In the carrier interrupt processing, the modules are sequentially executed in accordance with the order of stop, acceleration, constant speed, reading start, reading end, constant speed, deceleration, and stop. However, among them, the scanning-on flag is reset by a reading end module, namely, when the carrier unit 3 reaches a reading end position. In a reading start module of the carrier interrupt processing, a one-shot output of the reading sync signal CRST is started.

As such a sync signal, one pulse is generated in the carrier interrupt processing each time the carrier unit 3 is moved by one column while the carrier unit 3 is moving in the reading area. However, the sync signal is also simultaneously inputted to the MPU 21. In the reading start module of the carrier interrupt processing, each time the signal CRST is inputted 60 times, namely, each time 60 columns are read, a counter interrupt processing is activated.

In the counter interrupt processing, image distribution information in the paper feeding direction of the image data stored in the designated area in the RAM is calculated by the image data storage unit. When the scanning-on flag is reset, this distribution information is-also notified to the controller task via the common work.

When it is detected that the flag has been reset during the scanning, the controller task gets the image distribution information from the common work and detects a break of an original image pattern (S-48). Although the break of the image pattern is detected by detecting an interval between the lines here, the detecting method is not limited to the line interval but, for example, an interval between characters can be also detected. As shown in FIG. 9, a white distribution information detection area to detect the break of the image pattern is constructed by four bytes corresponding to 32 pixels from the lower end among the 128 photo-reception elements. For example, assuming that the 16th to 24th bits in the distribution information are equal to 0, this means that the whole original area which was read by the 112nd to 120th photo-reception elements is white.

From the image distribution information, the controller task judges whether there is a portion in which eight or more continuous white areas among the 32 photo-reception elements from the lower end among the 128 photo-reception elements were read or not (S-49).

When the continuous white areas don't exist, 128 dots are designated as a paper feed amount and a bidirection inhibition flag is set (S-50). When the continuous white areas exist, the dots as many as the number of dots (128−α) from the upper end to the last of the blank area are designated and the bidirection inhibition flag is reset and stored into a command buffer for the engine together with the paper feeding command (S-51).

From the reading mode, reading width, and image distribution information, the number [β=(128−α) * Scan columns/8] of image data which are transferred at this time to the host PC among the image data which has already been stored in the external RAM by the previous scan command is calculated (S-52) and is subtracted from the total number (γ) of image data which was calculated in step S-36 (S-53). When the resultant value is larger than 0, the scan command is again stored into the command buffer for the engine (S-54).

In the example of FIG. 9, as image information due to the execution of the scan command at the first time in the binary value mode, in the 96th pixel (96 bits) to 128th pixel (128 bits) from the head of the scanner head as a white distribution information detection area, the data as many as eight pixels from the 113rd pixel (113 bits) to the 120th pixel (120 bits) is equal to 0. Therefore, the bidirection inhibition flag is reset (S-51). The paper feeding command is set into the command buffer by the paper feed amount of 120 dots up to the 120th pixel as a final end of the white region. The total number of image data is updated to 237600 (=259200−120*360*⅛). The next scan command is also stored into the command buffer.

The controller task waits until the scan command generation flag is reset by the engine task at a period of 10 msec (S-55) and enables the data transfer from the scanner apparatus 1 to the host PC 8 through the host PC I/F control unit 26. In the image data which was read by the previous scan command stored in the storage area in the external RAM 23 shown by the address obtained in step S-43, only the image data corresponding to the paper feed amount designated in step S-51 is picked up from the storage area and is transferred to the host PC 8 (S-56). In the example of FIG. 9, β=21600 bytes (120*360*½) are transferred to the host PC in step S-56.

Figure 10:
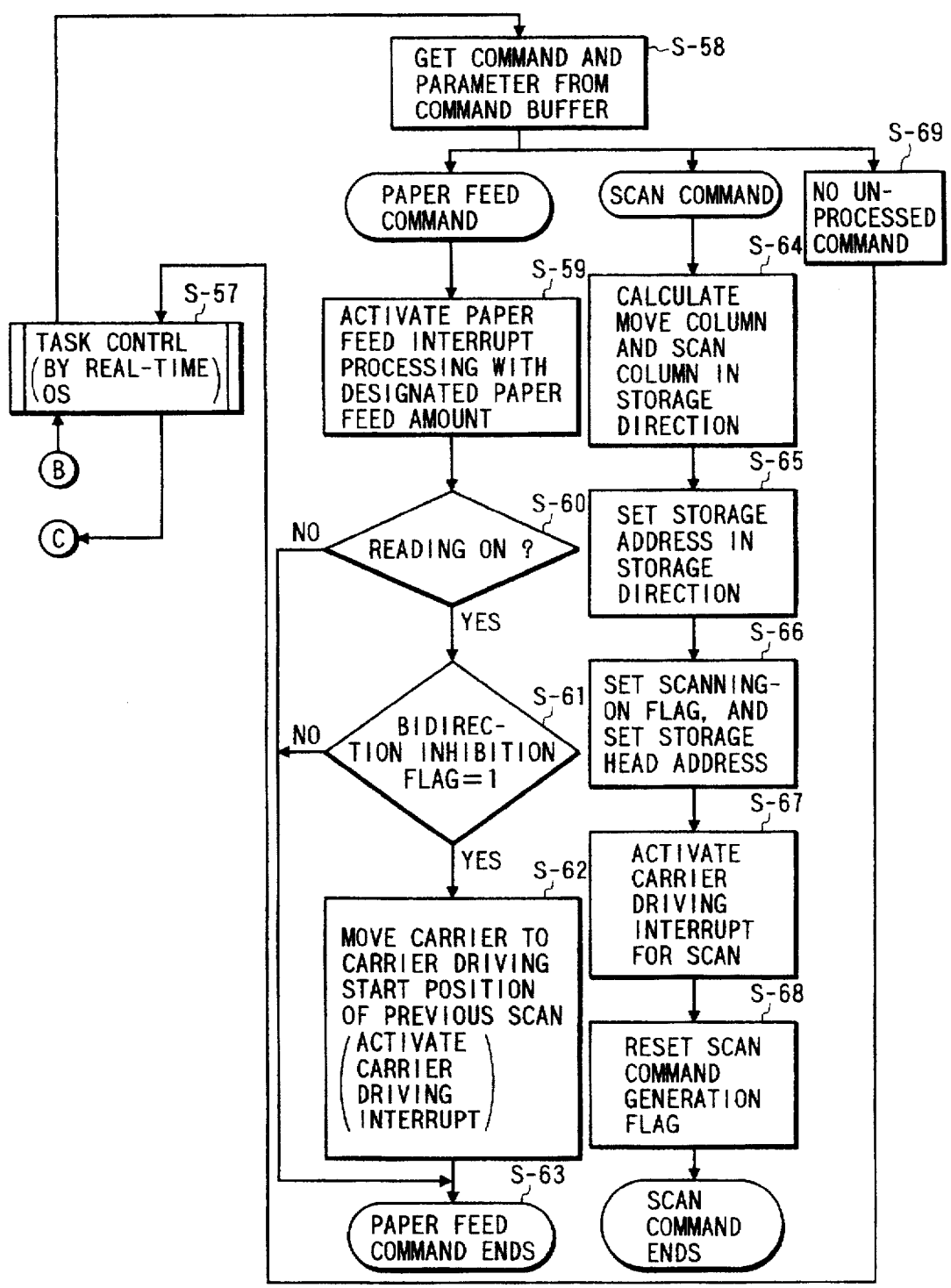
FIG. 10 is a control flowchart when a reading command is received from the host PC in the embodiment.

Referring now to FIG. 10, the occupation right of the MPU is shifted to the engine task by the real-time OS during the waiting of 10 msec in step S-55 in FIG. 9 (S-57). The engine task gets an unprocessed command from the command buffer (S-58).

A case where the unprocessed command is a paper feeding command will now be described. The driving of the LF motor 28 for the paper feeding is realized by modules of stop, acceleration, constant speed, deceleration, and stop in a timer interrupt processing in a manner similar to the driving of the carrier motor 27. The total number of driving steps of the paper feed stepping motor in each module corresponds to the designated paper feed amount in the paper feeding command.

In the paper feeding command, the paper feed amount designated as a parameter is first set to an input value and a timer for LF is activated (S-59). Subsequently, a reading-on flag is referred and when the reading operation is not being executed, the paper feeding command is finished (S-60).

During the reading operation, the bidirection inhibition flag which is designated from the control task is checked (S-61). When the flag is equal to 1 (in case of inhibition), the movement of the carrier unit to the position which was returned from the reading left end position at the time of the previous scan command by only a distance necessary for acceleration of the carrier is started (S-62). The execution of the paper feeding command is finished.

In this case as well, the actual movement of the carrier is obviously executed by modules of stop, acceleration, constant speed, deceleration, and stop by a carrier unit drive interrupt processing. In step S-62, a movement amount of the carrier unit, namely, the number of steps of the carrier motor 27 is set and a timer for activating the interrupt processing is merely started.

When the bidirection inhibition flag is equal to 0, since a possibility such that the execution of the next scan command is performed in the direction opposite to that of the previous execution is high, the carrier unit is not moved (S-63). When the paper feeding command is finished (actually, when the activation of the LF driving or carrier driving is finished), the engine command buffer is checked to judge the presence or absence of the unprocessed command (S-58).

Since the next scan command ought to have been set in step S-54, the scanning operation is activated in a manner similar to the processings from step S-41 (S-64 to S-68). The scan command routine is finished. If the previous scan relates to the storage area A, the present scan relates to the storage area B.

The engine command buffer is again checked. When there is no unprocessed command, the occupation right is shifted to the controller task by the real-time OS (S-69).

When the occupation right of the MPU 21 is shifted to the controller task and the transfer of the image data as much as the execution of the previous scan command is finished in step S-56, the processing routine is branched to step S-46 and the controller task waits for the end of the execution of the second scan command (S-70).

When the total image data amount (γ) is equal to 0 in step S-53 by repeating the above processings, the reading-on flag is reset (S-71). The reading operation is finished.

A 60-column counter interrupt processing will now be described.

Figure 11:
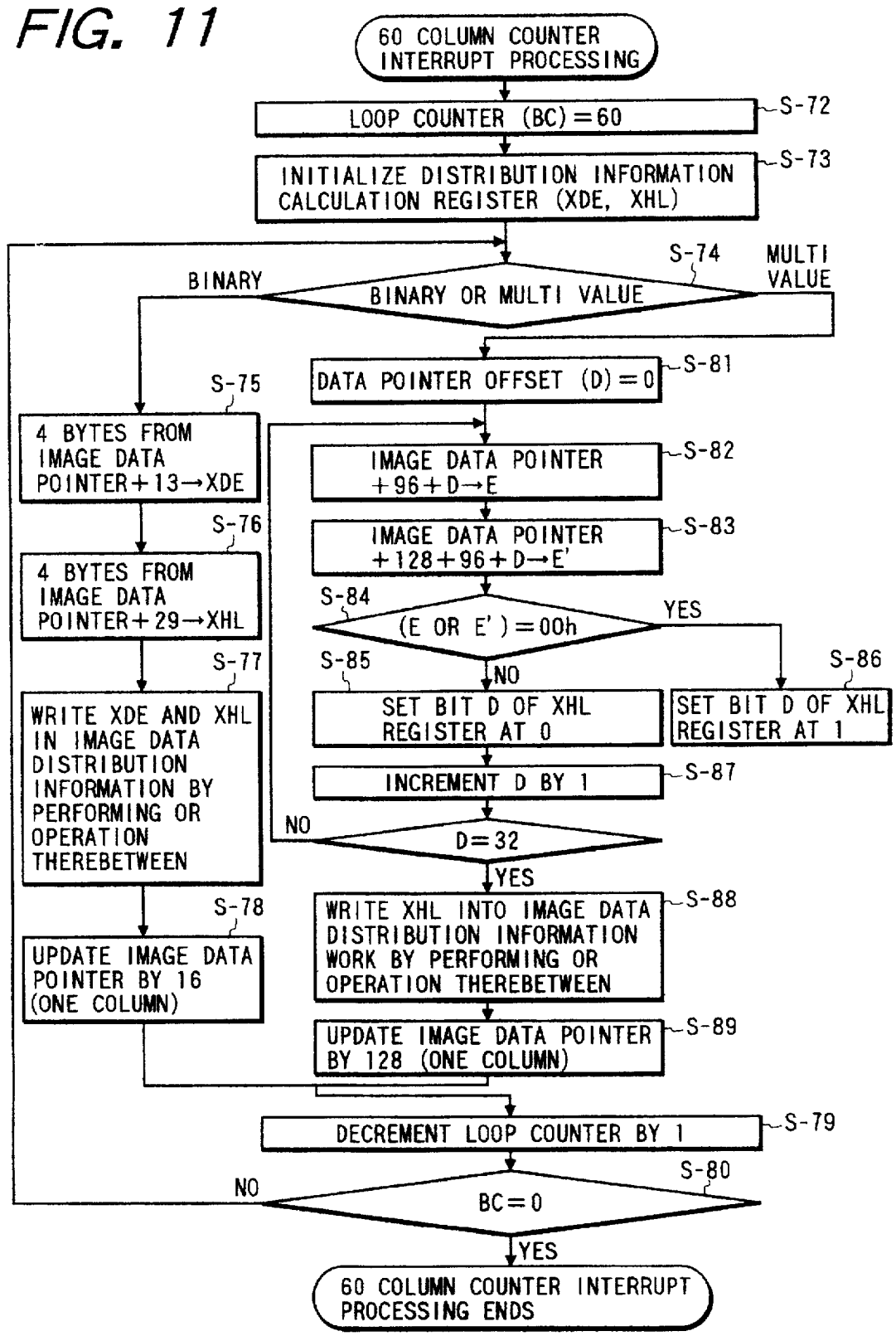
FIG. 11 is a flowchart for the white distribution information detection which is executed every image data storage of 60 columns in the embodiment.

For a period of time during which a reading end module is activated by a reading start module in the interrupt processing for driving the carrier unit and is executed, namely, for a period of time during which the carrier unit is scanning from the reading left end to the right end, the interrupt processing is executed each time the CRST signal as a sync signal for the image data storage control unit 24 and the scanner head is inputted 60 times. A control flow is shown in FIG. 11.

In the interrupt processing, four works of the reading mode (binary value, multi value), storage direction (forward direction, backward direction), image data pointer, and image data distribution information are used. Although any one of the four works is set by the reading start module in the carrier interrupt processing, the reading mode and the storage direction are not changed during the execution of one scan command. As an image data pointer, the value set in the image data storage control unit 24 is given as an initial value. As image data distribution information, the work of four bytes (32 bits) corresponding to 32 photo-reception elements from the lower end among the 128 photo-reception elements is given as an initial value 0.

First, an initial value 60 is set into a BC register as a loop counter to check 60 columns (S-72). Since an XDE (4 bytes) register and an XHL (4 bytes) register of the MPU 21 are used for calculating the distribution information, both registers are cleared to 0 (S-73).

The image data storage control unit 24 stores the image data as shown in FIG. 9. The position shown by the image data pointer corresponds to the first to eighth photo-reception elements among the photo-reception elements in case of the binary value mode and corresponds to the first one of the photo-reception elements in case of the multi value mode. In the embodiment, whether the bidirectional reading is permitted or not is detected by paying attention to the image data which was read by the 32 photo-reception elements from the lower end among the 128 photo-reception elements.

In the binary value mode, 0 has been read into the storage area as one bit of one pixel in case of white and 1 has been read in case of black. In the multi value mode, 00h has been read into the storage area as one byte of one pixel in case of perfect white and 0ffh has been read in case of perfect black. The image data distribution information denotes that all of the accumulated values (OR) by one scan of the image data which was read by the corresponding photo-reception element are white in case of 0 as one bit of one pixel and denotes that all of the accumulation values are not white in case of 1.

Whether the reading mode is the binary value mode or the multi value mode is judged (S-74). In case of the binary value mode, the value of four bytes from [(the value shown by the image data pointer)+13] (namely, the image data read by the 96th to 128th photo-reception elements) is set into the XDE register of the MPU (S-75). The value of four bytes from [(the value shown by the image data pointer as an adjacent column of the target column)+29 (1613)] (the image data which was read by the 96th to 128th photo-reception elements) is set into the XHL register of the MPU (S-76).

Subsequently, the AND of the XDE register and the XHL register is got and this value is OR-written into four bytes of the image data distribution information work (S-77). The image data pointer is updated by one column in accordance with the storage direction (S-78). The value of the BC register as a loop counter is subtracted by 1 (S-79). When the resultant value is larger than 0, the processing routine is branched to step S-74 (S-80).

The reason why the AND of the image data of two adjacent columns is got in step S-77 is to avoid an influence by a dust or the like on the original paper. The distribution information of the image data is checked by a two-dimensional window of 180 d.p.i. (=360/2) in the carrier direction of 360 d.p.i. in the paper feeding direction. For example, when a dust on the original can be easily collected like a recycled paper, newspaper, or the like, it is sufficient to widen the 2-dimensional check window.

In case of the multi value mode, 32 bytes from [(the value shown by the image data pointer)+96] are made correspond to bits 0 to 31 of the XHL register. A D register to denote an offset position from [(the image data pointer)+96] is initialized by 0 (S-81). The image data value of the address shown by [(the image data pointer)+96+D] is set into an E register (S-82). The image data value of the address shown by the adjacent column of the target column, namely, [(the image data pointer)+128+96+D] is set into an E' register (S-83). In step S-84, when the OR of E and E' is equal to 0, namely, when both of E and E' are equal to 0, the D-th bit of the XHL register is set to 0 (S-85). In the other cases, the D-th bit is set to 1 (S-86).

"1" is added to the value of the D register which denotes the position in 32 pixels (S-87). The processings from step S-82 are repeated until the value of D register is equal to 32. When D is equal to 32, since the white distribution information of 32 pixels of the target column has been set in the XHL register, this value is OR-written into the image data distribution information work of four bytes in the internal RAM (S-88). The image data pointer is updated by one column (128 bytes) in accordance with the storage direction (S-89). The processing routine is branched to step S-79 and the distribution information of the next column is detected.

By the above processings, the white distribution of the image data of 60 columns which was read by the 32 photo-reception elements from the lower end of the scan head is reflected to the image data distribution information of four bytes.

In the multi value mode as well, by changing a density of the 2-dimensional window, it is possible to cope with the dust on the original. However, in order to further raise the effect, it is sufficient that a slice level to judge whether the image data is white or not is set to a value that is slightly larger than 00h in step S-81.

Figure 12:
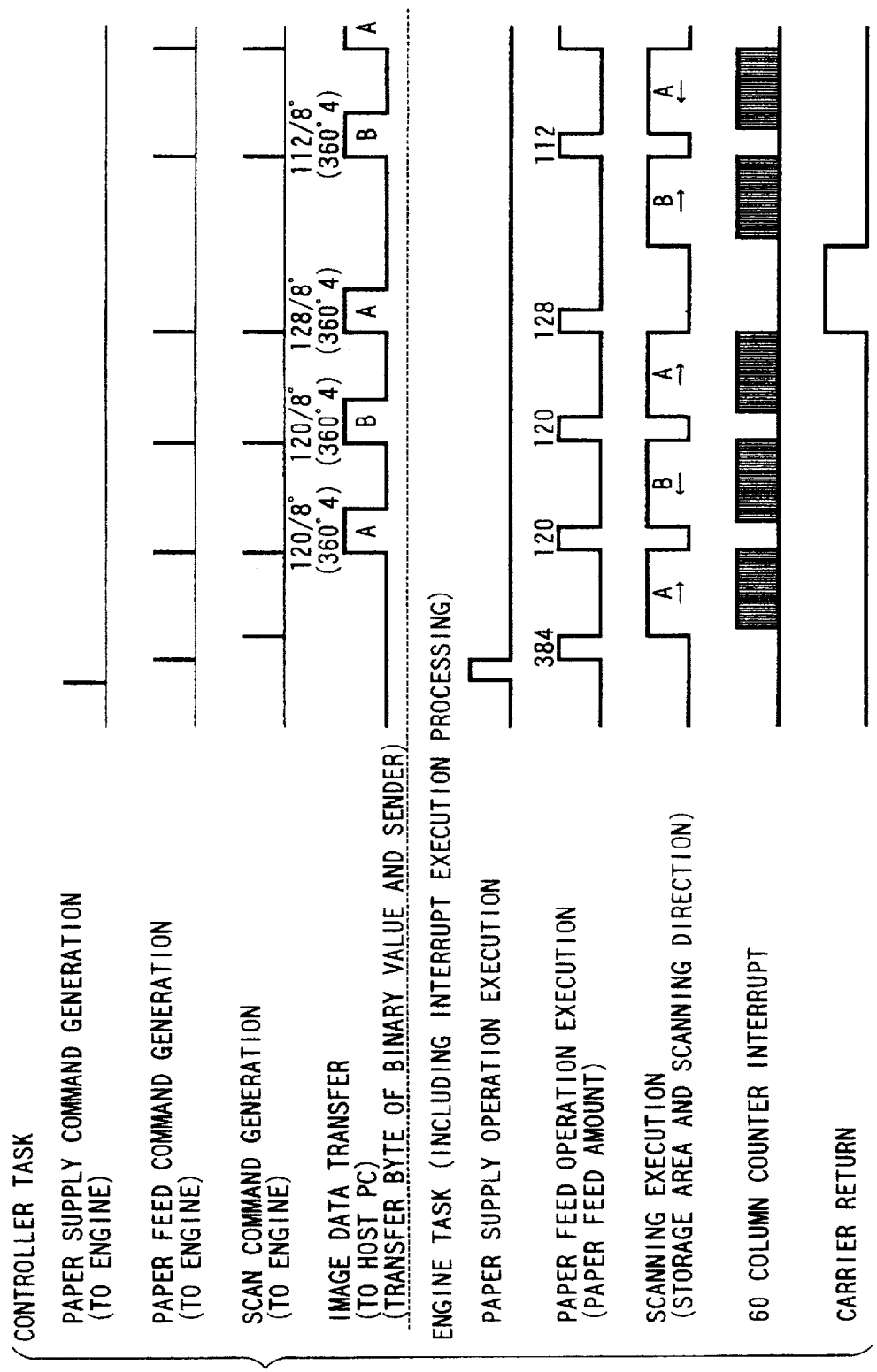
FIG. 12 is an operation timing chart of each task in the embodiment.

The above processings relate to the control flow of the reading operation by the controller task, engine task, and interrupt processing. FIG. 12 shows a timing chart for such a control flow. When the image data stored in the image data storage area A is being transferred to the host PC 8 by the controller task, the reading operation of the image of the next line is executed by the image data storage control unit 24. The read image data is stored into the storage area B. As for the image data stored in the area B, the image data distribution state of the block of the lower end of the photo-reception element is checked by the 60-column counter interrupt processing every 60 columns.

FIG. 13 shows a relative reading process of the carrier unit on the original surface in an original in which the effect of the invention can be most expected in comparison between the conventional example and the embodiment. In the original of a character base, the image reading in which a total movement distance of the carrier is set to be shorter, namely, at a high speed can be performed.

In the embodiment, the bidirection carrier scan has been judged on the basis of the presence or absence of the continuous white areas of eight dots or more by paying attention to the image data which was read by the 36 photo-reception elements from the lower end of the group of photo-reception elements. However, the number of image elements to which attention is paid is not limited to 36 and a judgment reference of the bidirectional scan is also not limited to eight dots.

In case of scanning in the direction opposite to the scan just before, the image data which was read by the photo-reception elements in a portion lower than the continuous white areas in the image data read by the scan just before is again read by the photo-reception element at the upper end of the next time.

Namely, in the case where a reading range such that the scanning time of the carrier unit occupies almost half of the total reading time is designated from the host PC 8, the reduction of the reading time in the bidirectional scan can be expected. However, in the case where a reading range such that a ratio of the scanning time of the carrier unit is contrarily relatively small is designated from the host PC, there is also a possibility such that the total reading time is contrarily increased for the bidirectional scan.

In this case, it is sufficient that a control flow such that a parameter such as 36 photo-reception elements or eight dots is used as a variable value and the controller task can designate the optimum value into the engine task in accordance with the reading range is added to the embodiment.

In the embodiment, two stepping motor such as carrier motor 27 and LF motor 28 have been used in order to simultaneously execute the decelerating operation and the paper feeding operation of the carrier for the high-speed operation. However, in case of preferentially considering the costs rather than the speed, by using a construction such that the carrier and the LF are commonly used by one stepping motor and are switched by a plunger or the like through an output port of the MPU, a scanner apparatus of lower costs can be realized. The scanner head is not limited to the head in which 128 photo-reception elements are arranged in one line in the paper feeding direction but the invention can be also applied to, for example, a case of a head in which the photo-reception elements are arranged in three lines of R, G, and B for a color.

Further, in the embodiment, the original paper has been moved by the LF motor 28 for the purpose of miniaturization of the apparatus. However, even in case of constructing such that the carrier unit itself is moved not only in the X-axial direction but also in the Y-axial direction, the embodiment can be applied by merely replacing the LF driving routine (executing routine of the paper feeding command) to a routine for moving the carrier unit in the Y-axial direction. In this case, although the apparatus itself enlarges, an oblique movement of the original paper at the time of the paper feeding doesn't fundamentally occur. Namely, since a possibility such that the more continuous white areas are detected is large, the effect of the invention can be further expected. The photo-reception unit is not limited to the line sensor but can be also constructed by an area sensor.

Although the detecting means of the white data distribution information has been realized by the software such as a 60-column counter interrupt processing, for example, it can be also constructed by a hardware circuit mainly constructed by an OR gate.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
 (a) a sensor in which a plurality of photo-reception elements are arranged;

(b) displacement means for changing a relative position between said sensor and an original in an arranging direction of said photo-reception elements or a direction different from said arranging direction;

(c) detecting means for detecting an image interval on the original read by said sensor; and (d) control means for controlling a relative displacement direction or displacement amount between the sensor and the original due to said displacement means in accordance with the image interval detected by said detecting means.

2. An apparatus according to claim 1, wherein said displacement means changes a relative position between said sensor and the original in a direction perpendicular to the arranging direction of said photo-reception elements.

3. An apparatus according to claim 1, further having memory means for storing an image on the original which was read by said sensor.

4. An apparatus according to claim 3, wherein said detecting means executes the detecting operation of said image interval in parallel with a storing operation of the image by said memory means.

5. An apparatus according to claim 1, wherein said detecting means detects the image interval by comparing a density of pixels read by a predetermined photo-reception element with a predetermined threshold value.

6. An apparatus according to claim 5, further having means for setting said threshold value in accordance with the original.

7. An apparatus according to claim 5, further having means for setting the photo-reception element that is compared with the predetermined threshold value by said detecting means in accordance with the original.

8. An apparatus according to claim 1, wherein said sensor includes a line sensor.

9. An apparatus according to claim 1, wherein the image on said original includes character data.

10. An apparatus according to claim 9, wherein said detecting means detects an interval between characters of the character data.

11. An apparatus according to claim 9, wherein said detecting means detects an interval between lines of the character data.

12. An image reading system for reading an image by using an image reading unit having a sensor in which a plurality of photo-reception elements are arranged, comprising:

(a) displacement means for changing a relative position between said sensor and an original in an arranging direction of said photo-reception elements or a direction different from said arranging direction;

(b) detecting means for detecting an image interval on the original which was read by said sensor; and (c) control means for controlling a relative displacement direction or displacement amount between said sensor and the original due to said displacement means in accordance with the image interval detected by said detecting means.

13. A system according to claim 12, wherein said displacement means changes a relative position between said sensor and the original in a direction perpendicular to the arranging direction of said photo-reception elements.

14. A system according to claim 12, further having memory means for storing the image on the original which was read by said sensor.

15. A system according to claim 14, wherein said detecting means executes the detecting operation of said image interval in parallel with the storing operation of the image by said memory means.

16. A system according to claim 12, wherein said detecting means detects the image interval by comparing a density of the pixels which was read by a predetermined photo-reception element with a predetermined threshold value.

17. A system according to claim 16, further having means for setting said threshold value in accordance with the original.

18. A system according to claim 16, further having means for setting the photo-reception element to be compared with the predetermined threshold value by said detecting means in accordance with the original.

19. A system according to claim 16, wherein said sensor includes a line sensor.

20. A system according to claim 12, wherein the image on said original includes character data.

21. A system according to claim 20, wherein said detecting means detects an interval between characters of the character data.

22. A system according to claim 20, wherein said detecting means detects an interval between lines of the character data.

23. An image reading method comprising the steps of:

reading an image on an original by changing a relative position between a sensor and the original in an arranging direction of a plurality of photo-reception elements arranged in said sensor or a direction different from said arranging direction;

detecting an image interval on the original read by said sensor; and controlling a relative displacement direction or displacement amount between said sensor and the original in accordance with the detected image interval.

24. A method according to claim 23, wherein a relative position between said sensor and the original is changed in a direction perpendicular to the arranging direction of said photo-reception elements.

25. A method according to claim 23, further comprising the step of storing the image on the original read by said sensor.

26. A method according to claim 23, wherein the detecting operation of said image interval is executed in parallel with the storing operation of said image.

27. A method according to claim 23, wherein the image interval is detected by comparing a density of the pixels which was read by a predetermined photo-reception element arranged on said sensor with a predetermined threshold value.

28. A method according to claim 27, further having the step of setting said threshold value in accordance with the original.

29. A method according to claim 27, further having the step of setting the photo-reception element which is compared with said predetermined threshold value in accordance with the original.

30. A method according to claim 23, wherein said sensor includes a line sensor.

31. A method according to claim 23, wherein the image on said original includes character data.

32. A method according to claim 31, wherein an interval between characters of the character data is detected.

33. A method according to claim 31, wherein an interval between lines of the character data is detected.

34. An image reading apparatus comprising:

(a) a sensor in which a plurality of photo-reception elements are arranged;

(b) displacement means for changing a relative position between said sensor and an original in an arranging direction of said photo-reception elements or a direction different from said arranging direction;

(c) position detecting means for detecting a position of said sensor for said original; and (d) control means for controlling a relative displacement direction between the sensor and the original due to said displacement means in accordance with the position of said sensor detected by said detecting means.

35. An apparatus according to claim 34, wherein said displacement means changes a relative position between said sensor and the original in a direction perpendicular to the arranging direction of said photo-reception elements.

36. An apparatus according to claim 35, wherein said position detecting means detects a distance between an end portion of said original and said sensor.

37. An apparatus according to claim 34, further having memory means for storing the image on the original read by said sensor.

38. An apparatus according to claim 34, wherein said sensor includes a line sensor.

39. An image reading system for reading an image by using an image reading unit having a sensor in which a plurality of photo-reception elements are arranged, comprising:

(a) displacement means for changing a relative position between said sensor and an original in an arranging direction of said photo-reception elements or a direction different from said arranging direction;

(b) position detecting means for detecting the position of said sensor for said original; and (c) control means for controlling a relative displacement direction between said sensor and the original due to said displacement means in accordance with the position of said sensor detected by said detecting means.

40. A system according to claim 39, wherein said displacement means changes the relative position between said sensor and the original in a direction perpendicular to the arranging direction of said photo-reception elements.

41. A system according to claim 39, wherein said position detecting means detects a distance between an end portion of said original and said sensor.

42. A system according to claim 39, further having memory means for storing the image on the original read by said sensor.

43. A system according to claim 39, wherein said sensor includes a line sensor.

44. An image reading method comprising the steps of:

reading an image on an original by changing a relative position between a sensor and the original in an arranging direction of a plurality of photo-reception elements arranged in said sensor or a direction different from said arranging direction;

detecting a position of said sensor for said original; and controlling a relative displacement direction between said sensor and the original in accordance with the position of said sensor which was detected.

45. A method according to claim 44, wherein the relative position between said sensor and the original is changed in a direction perpendicular to the arranging direction of said photo-reception elements.

46. A method according to claim 44, wherein said position detecting means detects a distance between an end portion of said original and said sensor.

47. A method according to claim 44, further having the step of storing the image on the original which was read by said sensor.

48. A method according to claim 44, wherein said sensor includes a line sensor.

\* \* \* \* \*

UNITED STATES PATENT AND TRADEMARK OFFICE
CERTIFICATE OF CORRECTION

PATENT NO. : 5,721,423

DATED : February 24, 1998

INVENTOR(S) : AKIHIKO HAMAMOTO

It is certified that error appears in the above-identified patent and that said Letters Patent is hereby corrected as shown below:

COLUMN 6

Line 49, "Supply" should read --supply--.

COLUMN 8

Line 14, "Binary" should read --¶ Binary--.

COLUMN 9

Line 31, "of-a" should read --of a--.

COLUMN 10

Line 7 "is-also" should read --is also--;
    Line 22, "112nd" should read --112th--;
    Line 29, "don't" should read --do not--; and
    Line 52, "113rd" should read --113th--.

COLUMN 13

Line 9, "correspond" should read --to correspond--.

UNITED STATES PATENT AND TRADEMARK OFFICE
CERTIFICATE OF CORRECTION

PATENT NO. : 5,721,423

DATED : February 24, 1998

INVENTOR(S) : AKIHIKO HAMAMOTO

Page 2 of 2

It is certified that error appears in the above-identified patent and that said Letters Patent is hereby corrected as shown below:

COLUMN 14

Line 23, "motor" should read --motors--; and
Line 48, "doesn't" should read --does not--.

Signed and Sealed this

Twenty-fifth Day of August, 1998

Attest:

BRUCE LEHMAN

*Attesting Officer*    *Commissioner of Patents and Trademarks*